United States Patent
Dai et al.

(10) Patent No.: US 9,858,126 B2
(45) Date of Patent: Jan. 2, 2018

(54) DEVICE REDIRECTION FOR REMOTE SYSTEMS

(75) Inventors: Chung Lang Dai, Redmond, WA (US); Vladimir Stoyanov, Redmond, WA (US); Joy Chik, Redmond, WA (US); Ahmed Tolba, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 753 days.

(21) Appl. No.: 12/970,660

(22) Filed: Dec. 16, 2010

(65) Prior Publication Data
US 2012/0158822 A1 Jun. 21, 2012

(51) Int. Cl.
*G06F 9/54* (2006.01)
*G06F 9/44* (2006.01)

(52) U.S. Cl.
CPC .............. *G06F 9/54* (2013.01); *G06F 9/4413* (2013.01)

(58) Field of Classification Search
CPC .... G06F 3/1204; G06F 3/1226; G06F 3/1286; G06F 3/1288; G06F 15/16
USPC ....... 709/227, 221, 219, 218, 228, 213, 234, 709/250; 715/810; 719/324, 321, 327; 726/14, 12; 713/189, 152
See application file for complete search history.

(56) References Cited

U.S. PATENT DOCUMENTS

| | | |
|---|---|---|
| 5,315,698 A | 5/1994 | Case et al. |
| 5,710,941 A | 1/1998 | Parry |
| 5,732,282 A | 3/1998 | Provino et al. |
| 5,748,980 A | 5/1998 | Lipe et al. |
| 5,761,411 A | 6/1998 | Teague et al. |
| 6,157,965 A | 12/2000 | Mohammed et al. |
| 6,247,067 B1 | 6/2001 | Berliner et al. |
| 6,321,279 B1 | 11/2001 | Bonola |
| 6,384,931 B1 | 5/2002 | Brown et al. |
| 6,388,679 B1 | 5/2002 | Kluck et al. |
| 6,388,687 B1 | 5/2002 | Brackett et al. |

(Continued)

FOREIGN PATENT DOCUMENTS

| | | |
|---|---|---|
| CN | 1257591 | 6/2000 |
| CN | 1307293 | 8/2001 |

(Continued)

OTHER PUBLICATIONS

"USB Support in MetaFrame Products", obtained at: http://www.dabcc.com/thinsol/Files/ctx816193.htm, created Oct. 8, 2001, 3 pages.

(Continued)

*Primary Examiner* — Arvin Eskandarnia

(57) ABSTRACT

The present disclosure provides systems and method for redirecting control of a client side connected USB device from the client to the server in a remote system. Specifically, the present disclosure creates a simulated USB device at the server. The simulated USB device is treated as a proxy for a redirected USB device at the client. The client side redirected USB device is not treated as the USB device but, rather, acts as a pass through to facilitate communication between requesting applications and the client connected device. The simulated USB device allows an application to send requests for a local device to the simulated USB device at the server. The simulated USB device then processes the requests and forwards the requests to the local device connected to the client.

30 Claims, 6 Drawing Sheets

(56) References Cited

U.S. PATENT DOCUMENTS

| | | |
|---|---|---|
| 6,466,982 B1 | 10/2002 | Ruberg |
| 6,549,934 B1 | 4/2003 | Peterson et al. |
| 6,779,185 B1 | 8/2004 | Roukbi et al. |
| 6,788,429 B1 | 9/2004 | Clough et al. |
| 6,810,412 B1 | 10/2004 | Chang |
| 6,874,147 B1 | 3/2005 | Diamant |
| 6,925,528 B2 | 8/2005 | Selkirk et al. |
| 6,934,711 B2 | 8/2005 | Pooni et al. |
| 6,993,642 B2 | 1/2006 | Burkhardt et al. |
| 6,993,649 B2 | 1/2006 | Hensley |
| 7,006,467 B2 | 2/2006 | Anton et al. |
| 7,058,788 B2 | 6/2006 | Niles et al. |
| 7,117,495 B2 | 10/2006 | Blaser et al. |
| 7,181,382 B2 | 2/2007 | Shier et al. |
| 7,207,041 B2 | 4/2007 | Elson et al. |
| 7,222,359 B2 | 5/2007 | Freund et al. |
| 7,317,914 B2 | 1/2008 | Adya et al. |
| 7,404,193 B2 | 7/2008 | Hen et al. |
| 7,421,710 B2 | 9/2008 | Qi et al. |
| 7,461,144 B1 | 12/2008 | Beloussov et al. |
| 7,505,455 B1 | 3/2009 | Goodwin et al. |
| 7,506,343 B2 | 3/2009 | Aslot et al. |
| 7,562,393 B2 | 7/2009 | Buddhikot et al. |
| 7,617,414 B2 | 11/2009 | Becker et al. |
| 7,660,910 B2 | 2/2010 | Miller et al. |
| 7,698,122 B2 | 4/2010 | Chrysanthakopoulos |
| 7,698,550 B2 | 4/2010 | Abhishek et al. |
| 7,730,157 B2 | 6/2010 | Baratto et al. |
| 7,792,923 B2 | 9/2010 | Kim |
| 7,810,089 B2 | 10/2010 | Sundarrajan et al. |
| 7,865,910 B2 | 1/2011 | Durojaiye et al. |
| 7,913,226 B2 | 3/2011 | Lowell et al. |
| 8,892,758 B2 | 11/2014 | Stoyanov et al. |
| 2001/0007140 A1 | 7/2001 | Landry et al. |
| 2002/0004852 A1 | 1/2002 | Sadovsky et al. |
| 2002/0018234 A1 | 2/2002 | Fu et al. |
| 2002/0196941 A1 | 12/2002 | Isaacson et al. |
| 2003/0023770 A1 | 1/2003 | Barmettler et al. |
| 2003/0045316 A1 | 3/2003 | Tjong et al. |
| 2003/0088642 A1 | 5/2003 | Price et al. |
| 2003/0117638 A1 | 6/2003 | Ferlitsch |
| 2003/0159140 A1 | 8/2003 | Candelore |
| 2003/0200289 A1 | 10/2003 | Kemp et al. |
| 2004/0073912 A1 | 4/2004 | Meza |
| 2004/0088557 A1 | 5/2004 | Malcolm et al. |
| 2004/0128412 A1 | 7/2004 | Harrison |
| 2004/0190042 A1 | 9/2004 | Ferlitsch et al. |
| 2004/0218580 A1 | 11/2004 | Bahl et al. |
| 2004/0239986 A1* | 12/2004 | Wise ........................ 358/1.15 |
| 2005/0002525 A1 | 1/2005 | Alkove et al. |
| 2005/0055486 A1 | 3/2005 | Natu et al. |
| 2005/0057519 A1 | 3/2005 | Coe et al. |
| 2005/0102452 A1 | 5/2005 | Williams et al. |
| 2005/0114870 A1 | 5/2005 | Song et al. |
| 2005/0228933 A1 | 10/2005 | Tsai |
| 2006/0069750 A1* | 3/2006 | Momtchilov et al. ........ 709/219 |
| 2006/0230236 A1* | 10/2006 | Finkelstein ......... G06F 12/0862 711/137 |
| 2006/0259818 A1 | 11/2006 | Howell et al. |
| 2007/0061477 A1* | 3/2007 | Stoyanov .............. G06F 9/4411 709/230 |
| 2008/0071962 A1* | 3/2008 | Yang .................... G06F 9/4411 710/313 |
| 2008/0247403 A1* | 10/2008 | Seo ..................... H04L 12/2832 370/401 |
| 2009/0043921 A1* | 2/2009 | Roy ............................... 710/31 |
| 2009/0150550 A1* | 6/2009 | Barreto et al. ............... 709/228 |
| 2009/0205000 A1* | 8/2009 | Christensen et al. ........... 725/61 |
| 2009/0265722 A1* | 10/2009 | Lu ............................ G06F 21/57 719/327 |
| 2010/0077019 A1* | 3/2010 | Holk .................... H04L 67/125 709/203 |
| 2010/0146076 A1* | 6/2010 | Adriazola ........... H04L 65/4084 709/219 |

FOREIGN PATENT DOCUMENTS

| | | |
|---|---|---|
| CN | 1453696 | 11/2003 |
| EP | 1164482 | 12/2001 |
| EP | 1553746 | 7/2005 |
| JP | Hei 11-184793 | 7/1999 |
| JP | 2002-024154 | 1/2002 |
| JP | 2002-373144 | 12/2002 |
| JP | 2004-527817 | 9/2004 |
| JP | 2004-326776 | 11/2004 |
| JP | 2005-210713 | 8/2005 |
| KR | 1020050037537 | 4/2005 |
| KR | 100631620 | 9/2006 |
| KR | 10-0706747 | 4/2007 |
| WO | WO0057587 | 9/2000 |
| WO | WO0241133 | 5/2002 |
| WO | WO03036486 | 5/2003 |

OTHER PUBLICATIONS

European Search Report for application No. 06 789 751.2, mailed Nov. 6, 2009 (5 pages).

Hirofuchi, Takahiro et al., "USB/IP—A Peripheral Bus Extension for Device Sharing Over IP Network", Proceedings of the Annual Technical Conference, USENIX Association, Apr. 9-15, 2005, 14 pgs.

Microsoft Windows 2000 Server Operating System: Windows 2000 Terminal Services Printer Redirection, White Paper, 2002 Microsoft Corporation, pp. 1-41.

Microsoft, "Remote Desktop Features", obtained Feb. 8, 2006 at http://www.microsoft.com/resources/documentation/Windows/Xp/all/reskit/en-us/Default.asp?url=/resources/documentation/Windows/XP/all/reskit/en-us/pree_rem_lshw.asp, 2 pages.

Notice of First Office Action from Chinese Patent Office for application No. 200680031439.4, mailed Aug. 7, 2009, (15 pages).

Notice of Second Office Action from Chinese Patent Office for application No. 200680031439.4, mailed Sep. 10, 2010, (16 pages).

Notice of Third Office Action from Chinese Patent Office for application No. 200680031439.4, mailed Nov. 26, 2010, (17 pages).

Office Action from European Patent Office for application No. 06 789 751.2, mailed Jan. 8, 2010 (5 pages).

Pan, Weimin et al., "Remote Management With Virtual Media in the DRAC 4", *Power Solutions*, Oct. 2004, available at: http://www.dell.com/downloads/global/power/ps4q04-20040105-Pan.pdf, pp. 30-34.

U.S. Appl. No. 11/278,529, filed Apr. 3, 2006, Amendment and Response filed Jan. 27, 2011, 9 pgs.

U.S. Appl. No. 11/278,529, filed Apr. 3, 2006, Amendment and Response filed Dec. 30, 2009, 14 pgs.

U.S. Appl. No. 11/278,529, filed Apr. 3, 2006, Amendment and Response filed Jun. 15, 2011, 910 pgs.

U.S. Appl. No. 11/278,529, filed Apr. 3, 2006, Amendment and Response filed Jul. 2, 2009, 16 pgs.

U.S. Appl. No. 11/278,529, filed Apr. 3, 2006, Amendment and Response filed Aug. 13, 2010, 17 pgs.

U.S. Appl. No. 11/278,529, filed Apr. 3, 2006, Final Office Action mailed Oct. 27, 2009, 15 pgs.

U.S. Appl. No. 11/278,529, filed Apr. 3, 2006, Final Office Action mailed Oct. 27, 2010, 17 pgs.

U.S. Appl. No. 11/278,529, filed Apr. 3, 2006, Non-Final Office Action mailed Mar. 15, 2011, 20 pgs.

U.S. Appl. No. 11/278,529, filed Apr. 3, 2006, Non-Final Office Action mailed Apr. 14, 2010, 16 pgs.

U.S. Appl. No. 11/278,529, filed Apr. 3, 2006, Non-Final Office Action mailed Apr. 2, 2009, 12 pgs.

Chinese 1st Office Action in Application 201210154728.0, mailed Oct. 17, 2014, 12 pages.

Chinese 2nd Office Action in Application 201210154728.0, mailed Mar. 12, 2015, 6 pages.

Chinese Decision on Re-Examination in Application 200680031439.4, mailed May 28, 2014, 19 pages.

Chinese Final Rejection in Application 200680031439.4, mailed Feb. 3, 2012, 12 pages.

(56) References Cited

OTHER PUBLICATIONS

Chinese Notice of Allowance in Application 201210154728.0, mailed Aug. 13, 2015, 4 pages.
Chinese Notice on Reexamination in Application 200680031439.4, mailed Mar. 12, 2014, 13 pages.
European Communication in Application 06789751.2, dated Mar. 6, 2015, 6 pages.
Japanese Notice of Allowance in Application 2008-530059, mailed Nov. 2, 2012, 6 pages.
Japanese Notice of Allowance in Application 2012-103736, mailed Jul. 2, 2013, 6 pages.
Japanese Notice of Rejection in Application 2008-530059, mailed Jul. 8, 2011, 4 pages.
Japanese Notice of Rejection in Application 2008-530059, mailed Feb. 3, 2012, 11 pages.
Japanese Notice of Rejection in Application 2012-103736, mailed Nov. 6, 2012, 7 pages.
PCT International Search Report in PCT/US2006/031708, mailed Jan. 2, 2007, 5 pages.
Takahiro Hirofuchi, Eiji Kawai, Kazutoshi Fujikawa, and Hideki Sunahara, USB/IP-a Peripheral Bus Extension for Device Sharing over IP Network, Apr. 10-15, 2005, USENIX Association, 17 pages.
U.S. Appl. No. 11/278,529, Amendment and Response filed Jan. 13, 2012, 11 pages.
U.S. Appl. No. 11/278,529, Amendment and Response filed Mar. 10, 2014, 11 pages.
U.S. Appl. No. 11/278,529, Notice of Allowance mailed Aug. 11, 2014, 13 pages.
U.S. Appl. No. 11/278,529, Notice of Allowance mailed Nov. 20, 2014, 4 pages.
U.S. Appl. No. 11/278,529, Office Action mailed Oct. 13, 2011, 24 pages.
U.S. Appl. No. 11/278,529, Office Action mailed Nov. 8, 2013, 26 pages.
U.S. Appl. No. 12/907,832, Amendment and Response filed May 31, 2011, 11 pages.
U.S. Appl. No. 12/907,832, Amendment and Response filed Feb. 1, 2012, 13 pages.
U.S. Appl. No. 12/907,832, Amendment and Response filed Sep. 11, 2014, 6 pages.
U.S. Appl. No. 12/907,832, Notice of Allowance mailed Apr. 1, 2014, 15 pages.
U.S. Appl. No. 12/907,832, Notice of Allowance mailed Jun. 11, 2014, 4 pages.
U.S. Appl. No. 12/907,832, Notice of Allowance mailed Aug. 29, 2014, 3 pages.
U.S. Appl. No. 12/907,832, Notice of Allowance mailed Oct. 23, 2014, 3 pages.
U.S. Appl. No. 12/907,832, Office Action mailed Feb. 3, 2011, 19 pages.
U.S. Appl. No. 12/907,832, Office Action mailed Sep. 1, 2011, 32 pages.

\* cited by examiner

DEVICE REDIRECTION FOR REMOTE SYSTEMS

BACKGROUND

Remote systems, such as Terminal Service™ (TS) systems and Virtual Desktop Infrastructure (VDI) systems provided by the Microsoft Corporation, involve a server computer system (sometimes referred to as a remote server) where clients, acting locally, use remote application programs hosted by and/or resident on such a server system. In these remote systems, client computers rely on the remote server computer to provide computing functionality through the resident application programs. Examples of remote application programs include word processing, multimedia, and data management programs, among others.

Benefits of remote systems are that the client computers can be relatively low-powered since most functionality and computation has been moved to or otherwise takes place at the remote server. Another advantage is that data can reside at the physical location of the remote server and can be acted upon at that location by remote application programs without having to be transferred over relatively slow communications links to the client computers. When client-side requests are forwarded to the server for action, the requests are said to be redirected to the server.

Given the benefits of moving functionality to the remote server, many applications have been developed to work remotely. However, some applications are designed to operate solely on the local level, e.g., device drivers for Universal Serial Bus (USB) devices. Meanwhile, many other remote applications operate in conjunction with these localized drivers to interface with or otherwise control the actual USB devices. Since existing server-side applications are unable to directly communicate with a client side USB device, e.g., access the low-level interface of the device itself, the USB device drivers must be installed on the local client system where the USB device is physically connected. A server-side application attempting to communicate with the USB device does so by interfacing with the USB device driver installed on the client through what is known as "high-level redirection." Aspects of high-level redirection are described in more detail in co-pending patent application titled "Plug and Play Device Redirection for Remote Systems," U.S. application Ser. No. 11/278,529, which is incorporated herein by reference. High-level redirection, which operates on high-level interfaces, however, prevents the installation of specific, locally designed applications on remote servers. That is, these locally designed applications or drivers need to access the low-level interfaces of the USB devices and high-level redirection does not enable this functionality.

Consequently, to enable USB device functionality or use by a remote server, one solution has been to connect the USB device to the remote server itself. Connecting the device to the remote server is not practical in an enterprise environment where the server may not be readily found or accessed. As stated before, the other option is to install the USB device driver on the client and interface with the USB device through a set of high-level, specifically created, applications. This solution is also impractical for the many classes of USB devices in which no high-level redirection application has been created. Moreover, such a solution requires significant installations on the client computer system such that replacing the client computer system is more problematic once the installations have occurred.

SUMMARY

The present disclosure describes systems and methods that use and/or enable the redirection of control of a USB device connected locally to a client computer system from the client to a remote server computer system, both of which are part of a remote system. More specifically, the present disclosure describes the creation of a simulated USB device at the remote server. The simulated USB device is treated as a proxy for a USB device connected to the client system. The client-side USB device is not treated as the USB device but, rather, acts as a pass through to facilitate communication between a requesting server side application and the device connected locally to the client. The simulated USB device allows a server side application to send requests for a local device to the simulated USB device at the server. The simulated USB device then processes the requests and forwards the requests to the device connected locally to the client.

Embodiments of the present disclosure describe methods for creating the simulated USB device at the server in a remote system. When a device is connected locally to the client, it is determined whether control of the device should be redirected to the server. Upon determination that control should be redirected, the specific identifier associated with the device is transformed into a globally unique identifier. The globally unique identifier conveys to the system that a generic USB device driver should be installed at the client. The generic USB device driver transmits device parameters for configuring a simulated USB device from an instance of the redirected USB device at the client to server side application. The device parameters are received at the server and used to create a simulated USB device at the server.

In other embodiments of the present disclosure, methods are described for redirecting isochronous requests to and from the simulated USB device at the server. Specifically, a first request and second request are received for forwarding to the simulated USB device. The first request is sent to the simulated USB device. Feedback is received from the simulated USB device that the request has been processed, even though the request has not been processed yet. Upon receipt of the feedback, the second request is sent to the simulated USB device. The first request and second request forwarded to the application at the client.

In another embodiment, a remote system for redirecting requests for a device connected locally to a client to a simulated USB device at a server is described. The system includes communicatively connected client and server computers, wherein the client computer is connected locally to a device. The system further includes a redirected USB device at the client that is not treated as the actual USB device. The system further includes a generic USB driver at the client that is configured to communicate with the instance of the local USB device and an application. The system further includes a simulated USB device at the server that is treated as the actual USB device and receives requests for the device from the application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE CONTENTS

The detailed description is described with reference to the accompanying figures.

DETAILED DESCRIPTION

Figure 1:
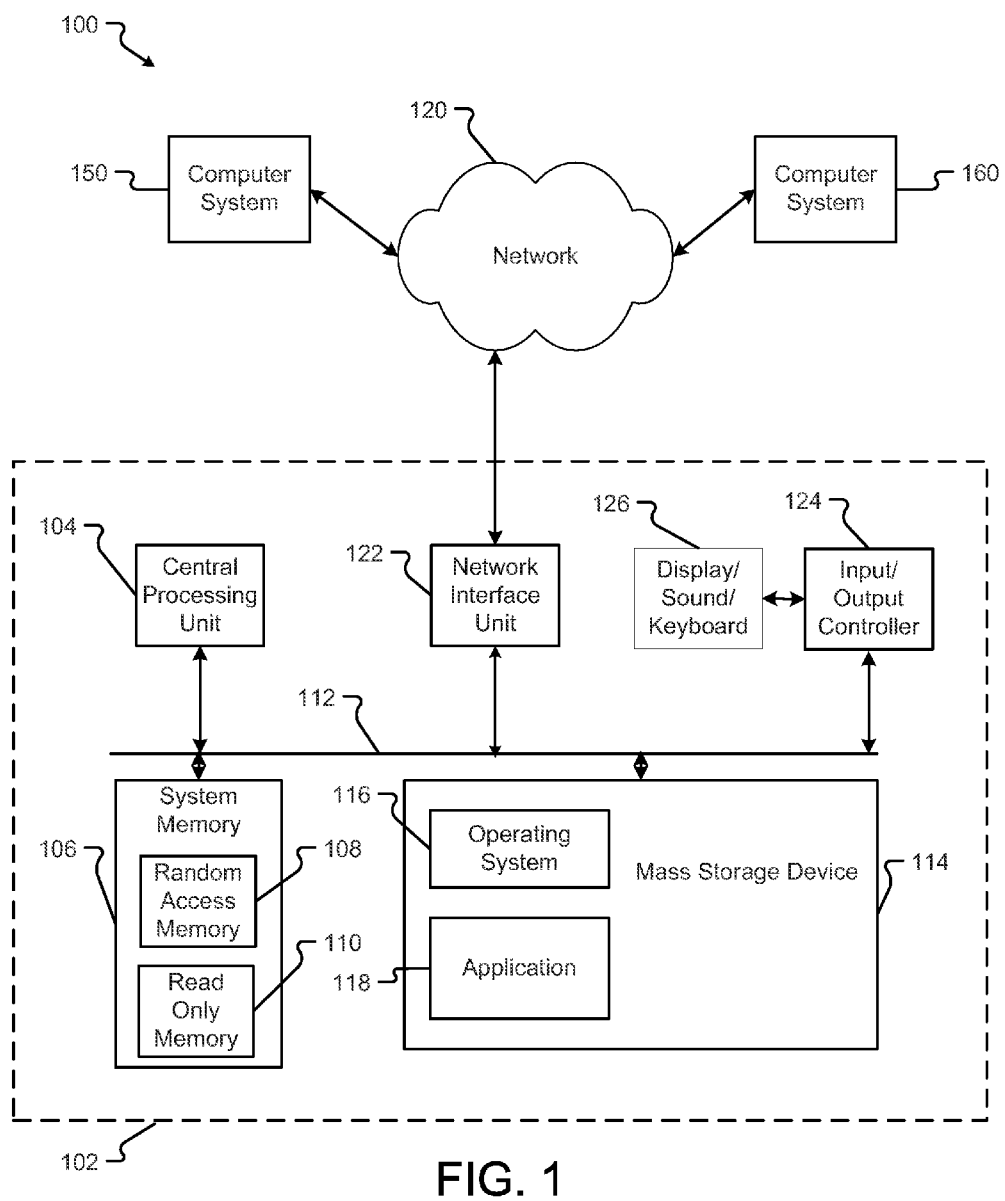
FIG. 1 illustrates an exemplary computing environment.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an exemplary computer architecture 100 for a computer system 102 utilized in various embodiments will be described. The computer architecture 100 shown in FIG. 1 may be configured in many different ways. For example, the computer 102 may be configured for use in a remote system as a server or a client. As shown, computer 102 includes a central processing unit 105 ("CPU"), a system memory 106, including a random access memory 108 ("RAM") and a read-only memory ("ROM") 110, and a system bus 112 that couples the memory 106 to the CPU 104. A basic input/output system containing the basic routines that help to transfer information between elements within the computer, such as during startup, is stored in the ROM 108. The computer 102 further includes a mass storage device 114 for storing an operating system 116, application programs 118, and other program modules.

The mass storage device 114 is connected to the CPU 104 through a mass storage controller (not shown) connected to the bus 112. The mass storage device 114 and its associated computer-readable media provide non-volatile storage for the computer system 102. Although the description of computer-readable media contained herein refers to a mass storage device, such as a hard disk or CD-ROM drive, the computer-readable media can be any available media that can be accessed by the computer system 102.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 102.

According to various embodiments, the computer system 102 operates in a networked environment using logical connections to remote computers through a network 120, such as the Internet. Remote computers may include one or more computer systems 150 and 160 comprising either clients or remote servers. The computer system 102 may connect to the network 120 through a network interface unit 122 connected to the bus 112. The network interface unit 122 may also be utilized to connect a client and server in a remote system. The network 120 may be implemented in a number of ways to support such networking contexts, including both wired-based technologies and wireless technologies. Aspects of this invention are not limited to one specific network architecture or network technology. The computing environment 100 is representative of different architectures which include direct dialup via modem, enterprise LANs (local area networks), WANs (wide area networks) and the Internet. Network 120 connects the server computer 202 to one or more client computers (e.g., client computer 204). Furthermore, the network 120 connection between the server computer and client computer may implement a transport protocol such as transmission control protocol over Internet protocol (TCP/IP).

The computer system 102 may also include an input/output controller 124 for receiving and processing input from a number of devices, such as: a keyboard, mouse, electronic stylus and the like 126. Similarly, the input/output controller 124 may provide output to a display screen, a printer, or some other type of device 126.

As mentioned briefly above, a number of program modules and data files may be stored in the mass storage device 114 and RAM 108 of the computer system 102, including an operating system 116 suitable for controlling the operation of a networked computer, such as: the WINDOWS 7®, WINDOWS SERVER®, WINDOWS SHAREPOINT SERVER®, operating systems from MICROSOFT CORPORATION; UNIX; LINUX and the like. The mass storage device 114 and RAM 108 may also store one or more program modules.

Figure 2:
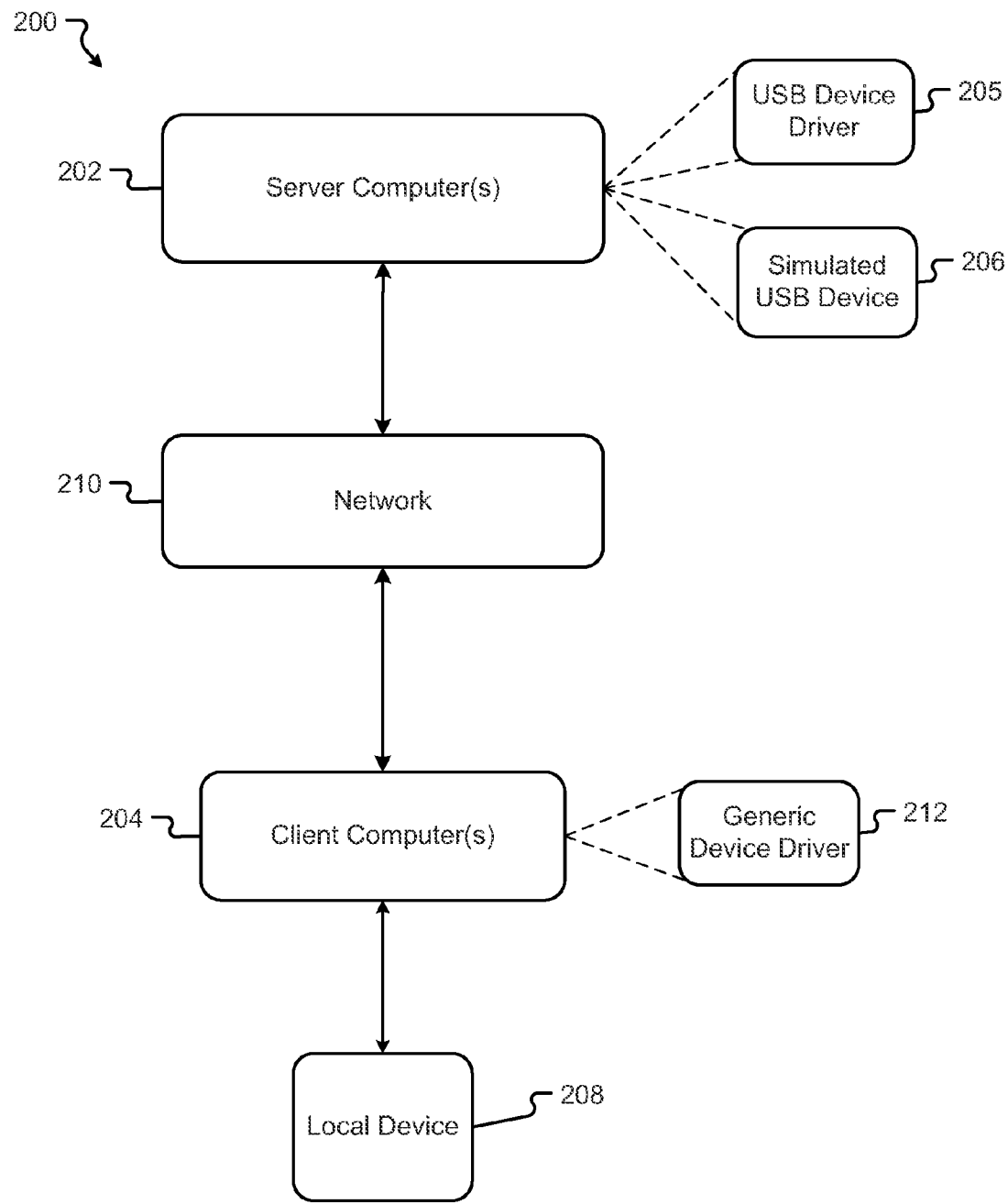
FIG. 2 is an illustration of a remote system that includes a server computer and client computer.

A remote system 200 incorporating aspects of the present disclosure is shown in FIG. 2. The remote system 200 includes one or more computers that utilize the computer environment 100 as described above in conjunction with FIG. 1. Specifically, the remote system 200 includes a server computer 202 and one or more client computers 204 over network 210. Client computer 204 includes generic device driver 212 and server computer 202 includes a USB device driver 205 and a simulated USB device 206 to facilitate redirecting control of device 208 locally connected to the client computer 204 to the server 202.

In this example, one client computer 204 is depicted however, in other implementations, the remote system 200 may include multiple client computers. Client computer 204 depicts a client computer to which one or more local devices 208 are connected. Local devices 208 are the physical USB devices connected to client computer 204. Access and control of local USB devices 208 connected at the client computer 204 may be redirected to the server computer 202 such that the local devices 208 are selectively accessed and controlled by the server computer 202. The remote system 200 may be a Terminal Service™ system, in one embodiment, or in another embodiment, system 200 may be a Virtual Desktop Infrastructure system as provided or defined by the Microsoft Corporation, where multiple client computers (e.g., client computer 204) rely on server computer 202 for all or certain application programs that provide functionality. Other remote systems may also implement aspects of the present disclosure as will be apparent to those skilled in the art.

The server computer(s) 202 may implement a communication protocol such as remote data protocol (RDP) defined by the Microsoft Corporation, in order to pass data or information or otherwise communicate with one another. The use of such communication protocols, and particularly RDP, may be implemented in the context of a remote system such as a Terminal Services™ system or the Virtual Desktop Infrastructure.

Client computer 204 is equipped with one or more device ports that connect USB devices, such as local devices 208. The device ports include USB 1.0, 1.1 and 2.0, and FireWire (IEEE 1394) ports that support existing and future standards. In particular, the device ports allow the connection of the local devices 208 to client computer 204. Local devices 208 include, but are not limited to, digital cameras, video cameras, hard disk storage devices, digital media recorders, printers, scanners, etc. As described in detail below, client computer includes a generic device driver 212 that redirects I/O responses from local device 208 to USB device driver 205 and simulated USB device 206 at the server 202.

Server computer 202 includes a simulated USB device 206 and USB device driver 205. In particular, as discussed in detail below, an application is configured to intercept all I/O requests to a simulated USB device 206 and forward the requests to local USB device 208. The simulated USB device 206 is created at the server computer 202 and functions as the USB device for the local device 208. Once the simulated USB device is created, the remote system 200 installs the necessary USB device driver 205 for the local device 208 at the server computer 202. An actual device driver for the local device 208 is not created at the client computer 204. The application cannot differentiate the simulated USB device 206 from redirected USB device 208 and communicates with simulated USB device 206 as a proxy for the instance of local USB device at the client.

Communications to server computer 202 and client computer 204 over network 210 may make use of I/O USB request packets (URB) communicated over RDP. In particular, application programs resident at the server computer 202 may implement URB to communicate with local devices 208. The URB may be communication data originating from application programs that includes requests to one or more of local devices 208. As will be described in more detail below, the I/O requests may be transmitted using isochronous requests in an optimized manner.

Figure 3A:
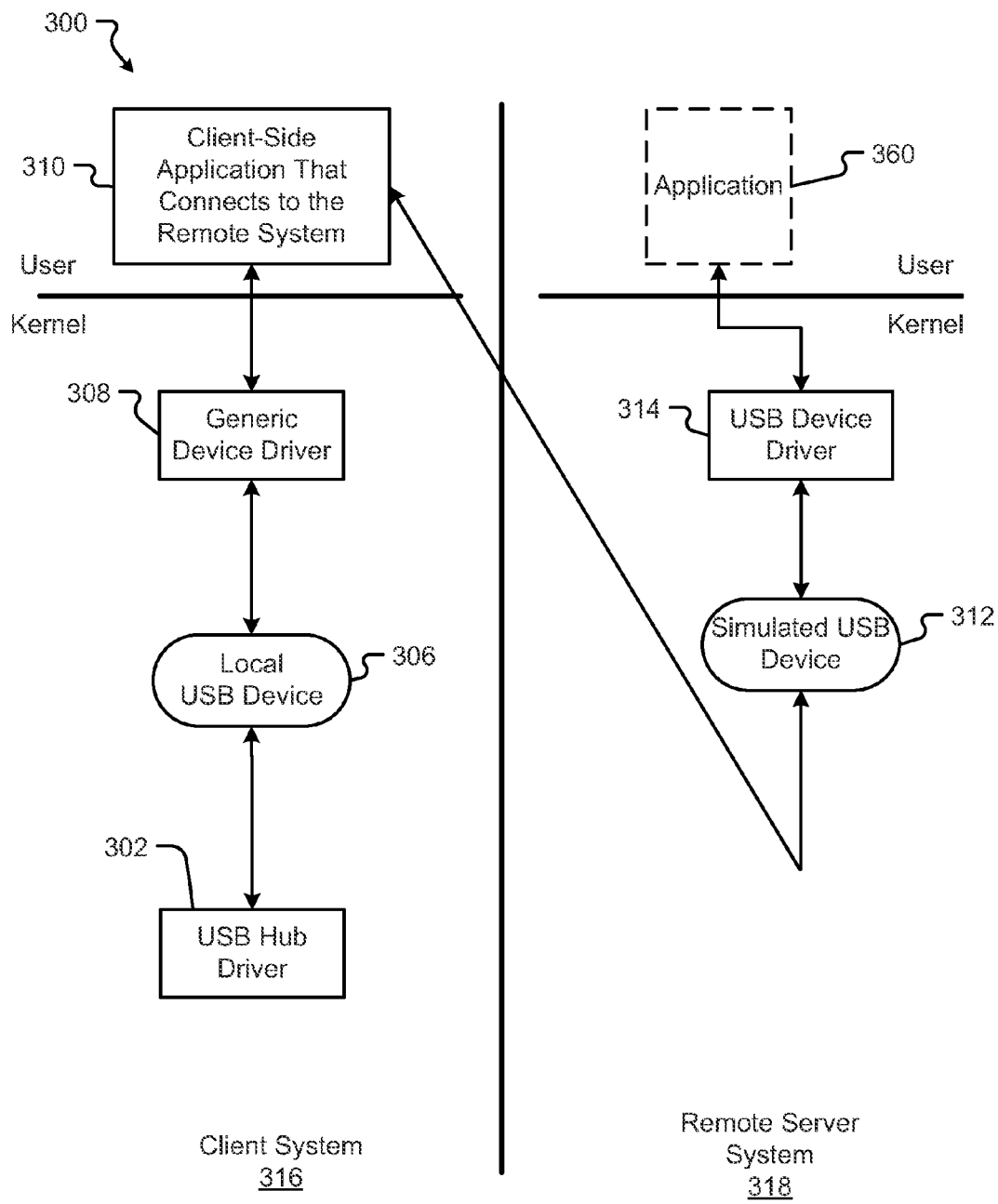
FIG. 3A is an illustration of a remote system for redirecting control of a local device from a client computer to a server computer.

FIG. 3A is an illustration of a remote system 300, which, in some embodiments, represents a more detailed view of remote system 200, shown and described in conjunction with FIG. 2. Remote system 300 involves redirecting control of a local device 208 from client system 316 to remote server system 318.

Remote system 300 is configured such that communication between application 360 and the instance of local USB device 306 is redirected via Simulated USB Device 312 and client side application 310. In one embodiment applications 310 and 360 are remote service client applications, running client side and server side respectively. The remote service client applications 310 and 360 may be a remote process such as a process implemented by Terminal Services™ or the Virtual Desktop Infrastructure. The remote service client application 310 may also be configured as a driver or other software configured to route I/O requests. Application 310 may primarily be used to provide communication between client system 316 and remote server system 318. In one embodiment, application 310 establishes communication between a client system 316 and remote server system 318 by creating a virtual channel to transfer USB request packets between a terminal server and a terminal client.

As discussed above, in a typical remote system, an instance of a USB device is created at the client computer to which the USB device is connected. As the instance of the USB device is created at the client, the remote system installs the USB device driver necessary for the USB device at the client computer as well. I/O requests from client computers in the remote system cannot be processed at remote server system because neither the USB device driver nor the instance of the USB device exists at the remote server system. I/O requests must, therefore, be directed to the client where the USB device driver and instance of the USB device exist.

The present disclosure relates to a remote system 300 that enables direct communication between the application 360 and a simulated USB device 312 located at the remote server system 318.

Local device 208 (not depicted) is connected to the client system 316 at the USB hub driver 302. The USB hub driver 302 may be in communication with one or more USB ports. Local device 208 may be inserted into one of the USB ports. Once local device 208 is inserted into a USB port, the local device 208 is communicatively connected to client system 316 via USB hub driver 302. It will be appreciated that multiple local devices 208 may be connected via the USB hub driver 302 at one time.

USB hub driver 302 discovers the one or more local devices 208 inserted into the USB ports. USB hub driver 302 determines if any of the local devices 208 should be configured for redirection to remote system 318. In one embodiment, upon this determination, USB hub driver 302 provides a list of one or more local devices 208 that could be redirected to a user of client system 316. The USB hub driver 302 then receives a selection of one or more local devices 208 for redirection. In another embodiment, USB hub driver 302 automatically redirects control of a local device 208 upon determining that control of the local device 208 should be redirected to the remote server system 318.

When a local device 208 is selected for redirection, the USB hub driver 302 exposes an interface to redirect control of the local device 208 to the remote server system 318. In order to redirect control of local device 208 to remote server system 318, USB hub driver 302 performs device morphing on the local device 208. Device morphing occurs when an identifier associated with a local device 208 is transformed from a unique identifier for the local device 208 to a globally unique identifier (GUID) common to the interface exposed by the USB hub driver 302. The identifier is preconfigured and indicates to the system that generic device driver 308 needs to be installed for the device. The globally unique identifier may be a randomly generated value when remote system 300 is configured. Once the remote system is configured, the identifier stays the same. The globally unique identifier is stored at the USB hub driver 302.

USB hub driver 302 uses the globally unique identifier to create an instance of local USB device 306 at client system 316. The remote system 300, however, does not recognize the instance of local USB device 306 as the actual device. Rather, the instance of the local USB device 306 acts as a pass through to facilitate communication with local device 208.

When local device 208 is identified with a globally unique identifier, the system determines the software necessary to install generic device driver 308 and installs generic device driver 308 at client system 316. When generic device driver 308 is installed at the client system 316, a USB device driver for the specific local device 208 is not installed at the client system. Rather, generic device driver 308 exposes an interface to communicate with both the instance of local USB device 306 and application 310.

Generic device driver 308 serves as a gateway between client system 316 and remote server system 318. I/O requests from remote server system 318 to client system 316 are repackaged and routed through generic device driver 308 and vice versa. Generic device driver 308 is configured to interpret for the local device 208 what application 310 is asking of it and to interpret for the application 310 the response from local device 208.

Generic device driver 308 assists in the creation of USB device driver 314 and simulated USB device 312 at remote server system 316. Specifically, generic device driver 308 receives device parameters from the instance of the local USB device 306. Device parameters include parameters necessary to configure simulated USB device 312 at remote server system 316. The generic device driver 308 forwards the device parameters to application 310. Application 310 communicates the device parameters to application 360 at remote server system 316. The device parameters are used by application 360 at remote server system 318 to configure simulated USB device 312. In one embodiment, the device parameters are sent from the generic device driver 308 in an Add Device message.

Simulated USB device 312 is installed at remote server system 318 using the device parameters sent over the network. The device parameters are used to configure the simulated USB device 312 so that it is identical to the instance of the local USB device 306 at client system 316. In other words, application 360 is unable to differentiate between simulated USB device 312 and the instance of local USB device 306 at client system 316 and interacts with simulated USB device 312 as if it were the instance of local USB device 306. Once the simulated USB device 312 is created, the applications 310 and 360 can communicate with it directly. The system recognizes simulated USB device 312 as the actual USB device and installs the necessary driver, represented as USB device driver 314. The USB device driver 314 is the actual driver for the local USB device 306. In one embodiment, both USB device driver 314 and simulated USB device 312 are stored at the remote server system 318 and persist in storage even after the local device 208 has been disconnected from client system 316. In another embodiment, the simulated USB device 312 may be removed when local device 208 is disconnected from the client system.

Simulated USB device 312 receives I/O requests for local device 208 routed through application 310. Simulated USB device 312 then repackages the I/O requests for forwarding to application 310. Communication protocols such as RDP compress I/O requests before transmission over a network. Simulated USB device 312 is configured to repackage I/O requests before they are compressed by such a communication protocol. Sending repackaged I/O requests eliminates transmission of unnecessary data and condenses the request into the smallest number of bytes without losing information. The simulated USB device 312, thus, determines which information is useful and repackages the I/O requests to contain only the data necessary for the local device to perform an action. Once an I/O request is repackaged by simulated USB driver 312, it is compressed using a communication protocol, such as RDP, and transmitted over the network as a USB request packet. Application 310 receiving the request then decompresses the USB request packet and adds any information necessary for local device 208 to understand the I/O request. In another embodiment, generic device driver 308 decompresses the USB request packet and adds any information necessary for local device 208 to understand the I/O request.

In a similar manner, I/O responses from local device 208 to simulated USB device 312 are repackaged at either application 310 or generic device driver 308. The repackaged I/O response is then compressed into a USB request using a communication protocol such as RDP. The USB request is transmitted over the network from application 310 to simulated USB device 312. Upon receipt of the USB request, the simulated USB device 312 decompresses the USB request and adds any information necessary for the USB device driver 314 to understand the I/O response.

In an embodiment, URB write requests are sent between server side application 360 and client side application 310 in an optimized isochronous manner. In general, isochronous requests include a time when the request should be processed by the device. Once the URB packet is processed by the device, feedback is sent to indicate that a next URB packet should be sent. Isochronous requests generally ensure that URB packets are not received out of order nor are URB packets lost during transmission. However, in a lossy and high latency network, isochronous requests can cause unnecessary delay between receipts of URBs. The delay from network latency may also increase due to the delay caused by the feedback mechanism. In an embodiment, the present disclosure decreases the delay caused by optimizing isochronous requests by "faking" feedback.

Specifically, when receiving I/O requests sent from application 360, simulated USB device 312 sends feedback requesting that a second URB be sent before the first URB is even forwarded to application 310. Alternatively, when sending I/O requests to application 310, application 360 receives "faked" feedback allowing application 360 to send a second URB before the first URB has been received. This feedback mechanism offsets the increased network latency experienced in systems that use isochronous data requests.

In another embodiment, the instance of local USB device 306 and the generic device driver 308 only exist for the duration that local device 208 is connected to the client system 316. If local device 208 is disconnected and then reconnected, the instance of the local USB device 306 and generic device driver 308 must be recreated using the stored globally unique identifier for local device 208.

Figure 3B:
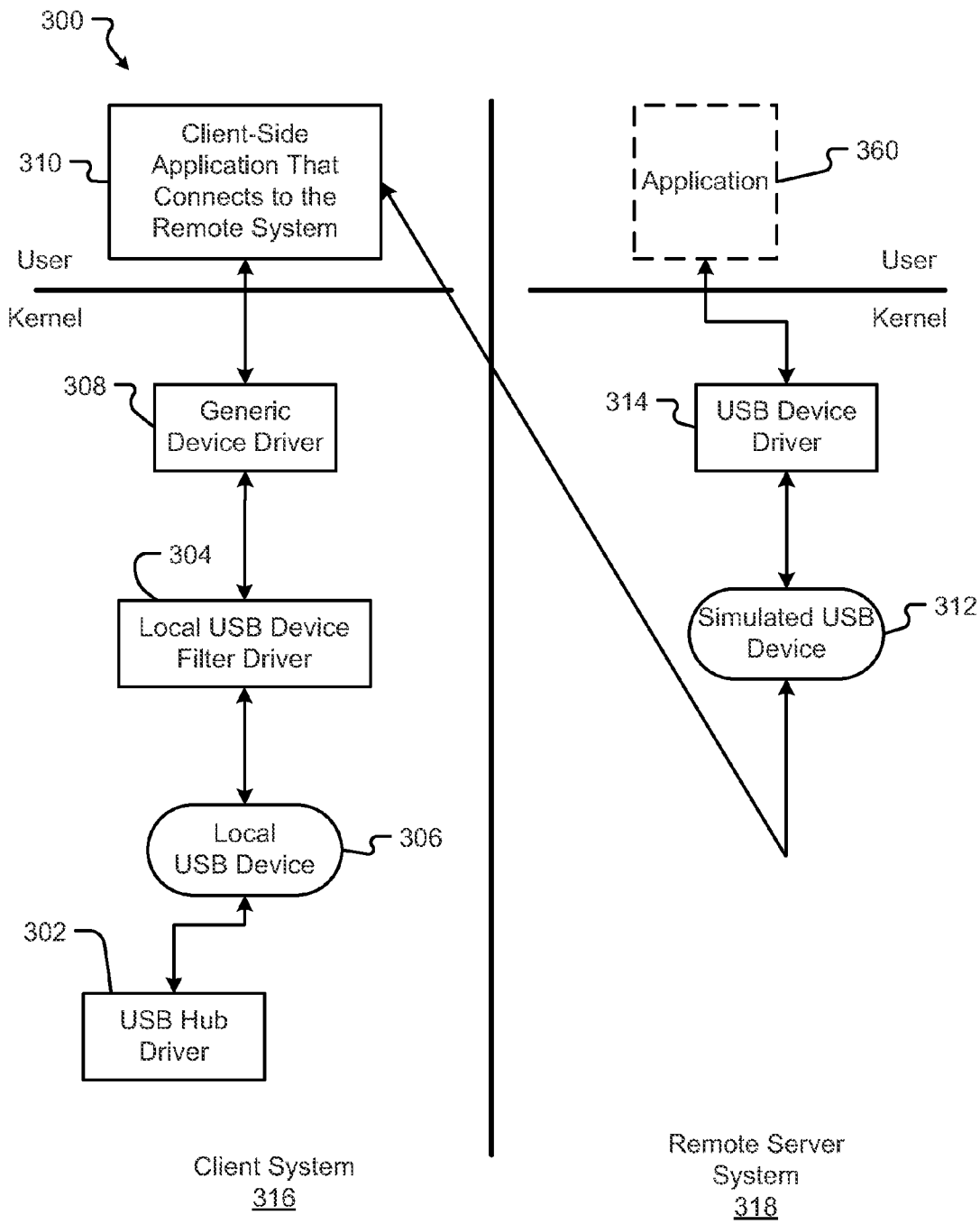
FIG. 3B is an illustration of an alternative embodiment from that shown in FIG. 3B showing the use of a filter driver.

FIG. 3B depicts another embodiment of a remote system 300 where control of a local device 208 is redirected from client system 316 to remote system 318.

In FIG. 3B device morphing occurs outside of the USB hub driver 302 at the local USB device filter driver 304. The local USB device filter driver 304 transforms the specific identifier associated with local device 208 into a globally unique identifier. The globally unique identifier is stored at the local USB device filter driver 304 in association with local device 208.

Figure 4:
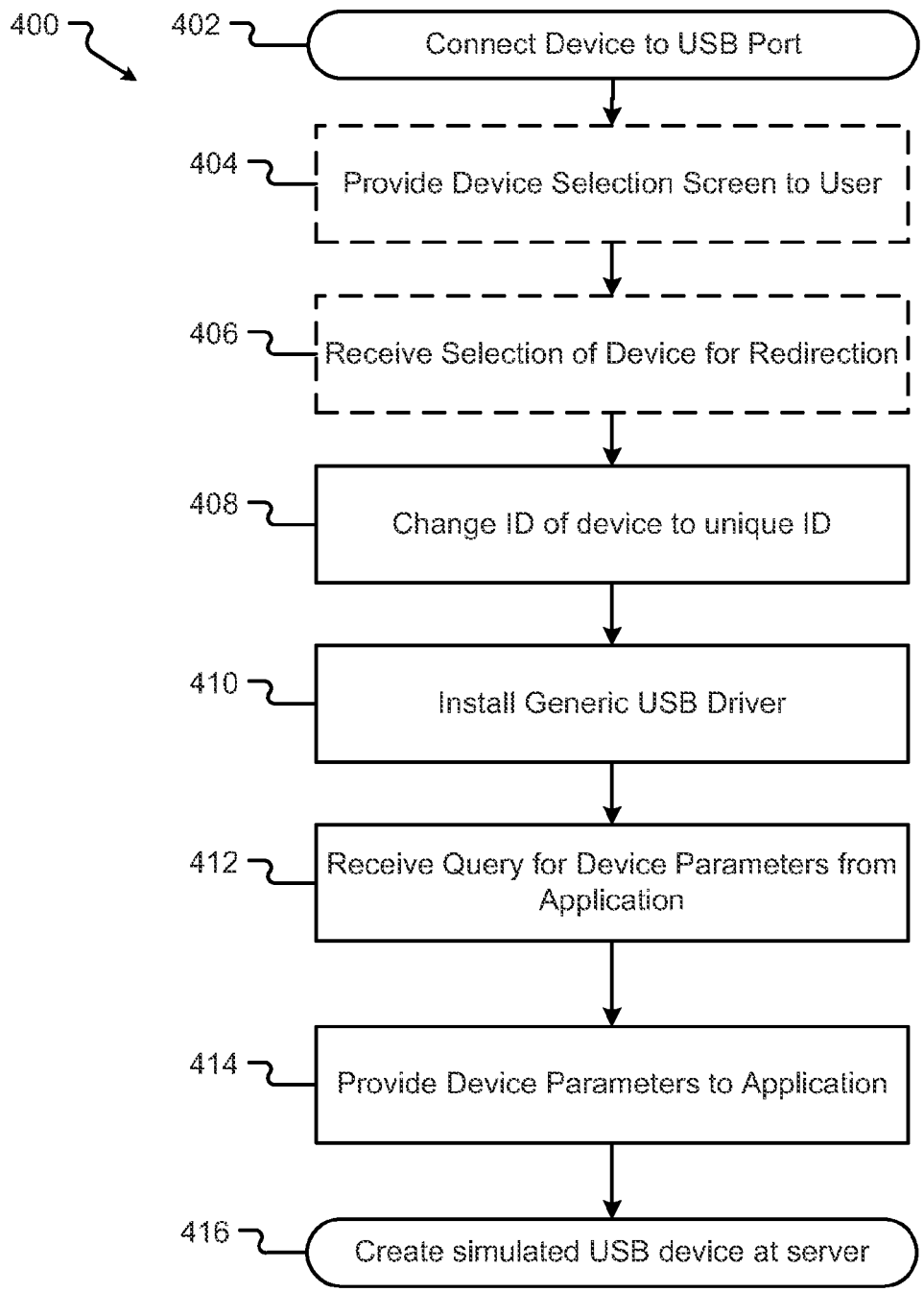
FIG. 4 is a flow diagram illustrating an exemplary method for creating a simulated USB device at a server computer.

FIG. 4. is a flow diagram illustrating an exemplary method 400 for creating a simulated USB device at a server computer. Some operations are optional, and these optional operations are encompassed by dashed lines.

At operation 402, a local device is discovered as connected to a USB port. In one embodiment, the local device is discovered by USB hub driver. Flow then proceeds to either operation 404 or operation 408.

At operation 404, an embodiment provides a device selection screen. The device selection screen may be a user interface with one or more elements for selection. The USB hub driver recognizes local devices that are inserted into the one or more USB ports. In one embodiment, the USB hub driver determines which local devices should be provided in the device selection screen. For example, three local devices may be connected to the client system via the USB ports. The first local device is a keyboard device, the second local device is a printer device, and the third local device is a speaker device. The USB hub driver may determine that the user should not redirect the keyboard as control of the keyboard should be maintained locally at the client computer. On the other hand, the USB hub driver may determine that the user could redirect the printer device or the speaker device as control of these local devices could be maintained remotely at the server computer. After making this determination, the USB hub driver provides to the client system only the printer device and the speaker device as selectable devices in a device selection screen. Flow then proceeds to operation 406.

At operation 406, a selection of a local device for redirection is received. The selection is made when a user selects a local device from the device selection screen. Using the example described with reference to operation 404, a user may be presented with a printer device and a speaker device as selectable devices in a device selection screen. In this example, the user may select the printer device for redirection and not select the speaker device. As will be appreciated by one skilled in the art, none, one, or more than one local device may be selected from the device selection screen for redirection. If a local device is not selected for redirection, the unselected local device retains its specific identifier and the USB device driver for the unselected local device is installed at the client system. Consequently, control of the unselected local device is not redirected to the remote server system. Alternatively, if a local device is selected for redirection, flow proceeds to operation 408.

At operation 408, the identifier for the local device is changed from an identifier specific to the local device to a globally unique identifier. In one embodiment, this transformation occurs at the USB hub driver. In another embodiment, this transformation occurs at the local USB device filter driver. Flow then proceeds to operation 410.

At operation 410, an instance of the redirected USB device is created. In one embodiment, the instance of the redirected USB device is created at client system by USB hub driver. In another embodiment, the instance of the redirected USB device is created by the local USB device filter driver that morphed the local device identifier. The remote system does not recognize redirected USB device as the actual USB device. Rather, redirected USB device acts as a pass through and facilitates communication with local device. Flow then proceeds to operation 412.

At operation 412, generic device driver is created. Local system recognizes that local device has been associated with a globally unique identifier. This recognition triggers the local system to install generic device driver at the client system. When generic device driver is installed at the client system, a USB device driver for the local device is not installed at the client. Generic device driver exposes an interface for communication with application. This interface allows generic device driver to forward information from local device to simulated USB device via client side and server side applications. The interface also allows generic device driver to receive information forwarded from simulated USB device via application for forwarding to local device. Flow then proceeds to operation 414.

At operation 414, device parameters for local device are communicated from client side application to server side application. Device parameters may include software necessary to configure simulated USB device. In one embodiment, the device parameters are sent in an Add Device message. As discussed above, the device parameters may be repackaged such that only those device parameters necessary to configure simulated USB device are transmitted. Once the device parameters are repackaged, the request is compressed using a communication protocol such as RDP. The compressed and repackaged device parameters are sent over the network to create simulated USB device 312 at the remote server system. Flow then proceeds to operation 416.

At operation 416, the simulated USB device for local device is created at the remote server system using the device parameters. Upon creation of the simulated USB device, the remote system recognizes it as the actual USB device and installs the necessary USB device driver. As discussed above, USB device driver is the actual driver for local device. Once simulated USB device is created and USB device driver is installed, I/O requests for local device are sent to simulated USB device from server side applications. Simulated USB device then forwards the I/O requests to local device via client side applications.

Figure 5:
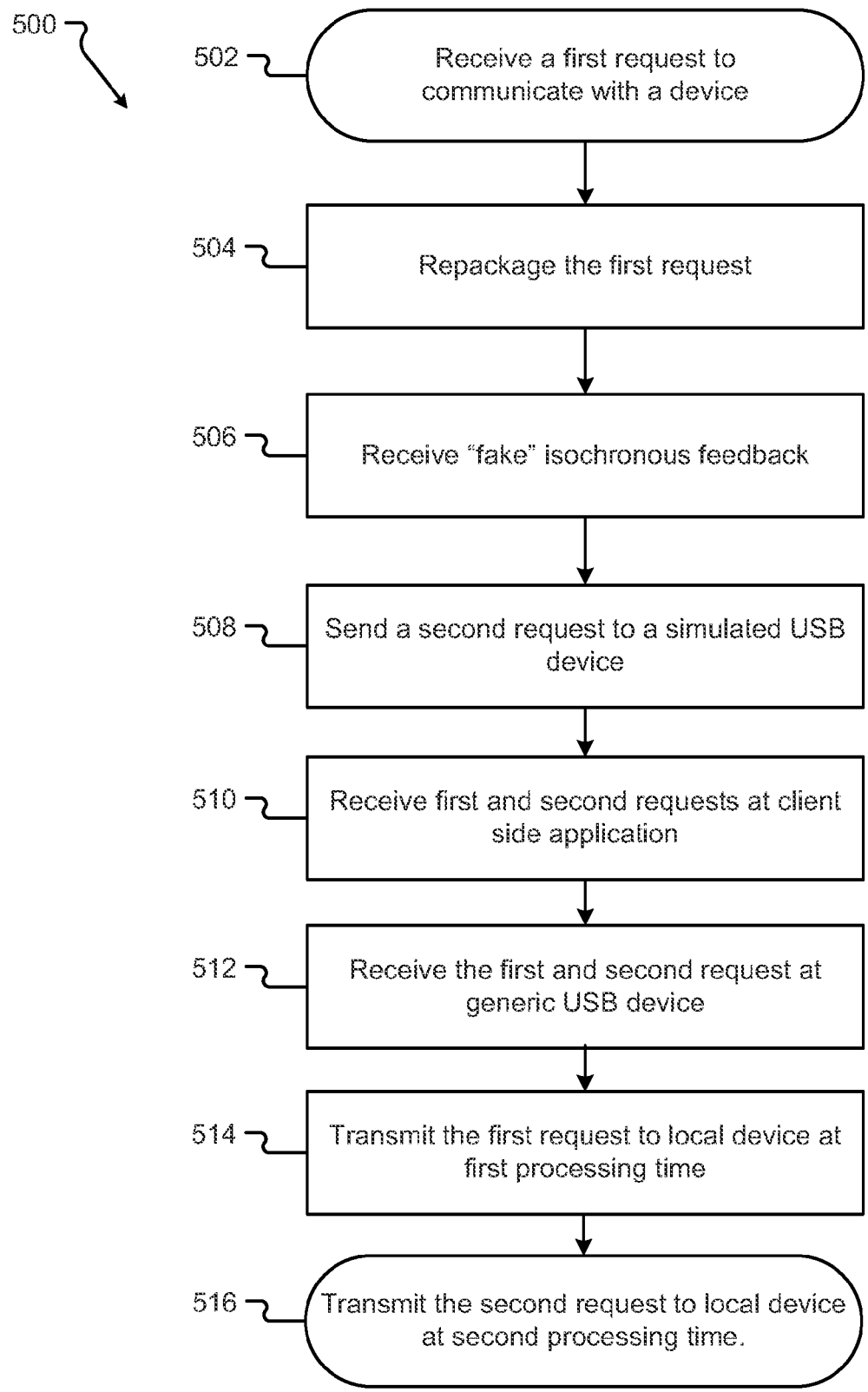
FIG. 5 is a flow diagram illustrating an exemplary method for redirecting communication to and from a simulated USB device located at a server computer.

FIG. 5 is a flow diagram illustrating an exemplary method 500 for redirecting communication to and from a simulated USB device 312 located at a server computer 202.

At operation 502, a first request is received to communicate with a local device. The first request may be an isochronous I/O write request received by a server side application 360 and includes an indication of a first processing time. Some exemplary requests include requests for data from the device and submission of data to the device. As will be appreciated by one skilled in the art, any number of requests is contemplated within the scope of the present disclosure. For example, a local device may be a USB connected speaker playing a song. As speakers do not usually have storage, the server side application 360 must continuously send segments of the song for the speaker to play. The request is routed to simulated USB device 312. Once the simulated USB device 312 receives the first request, flow proceeds to operation 504.

At operation 504, the simulated USB device 312 repackages the I/O request. As discussed above, the simulated USB device 312 removes unnecessary data from the I/O request. Removing unnecessary data condenses the I/O request into the smallest number of bytes without losing information. The repackaged request is then compressed using a communication protocol such as RDP. Flow then proceeds to operation 506.

At operation 506, "fake" isochronous feedback is received at the server side application 360. As discussed above, in a system that employs isochronous data requests, a next USB request may not be sent before the first USB request is processed at the time indicated in the first request itself. As a result, delays in a high latency network are increased from the additional delay caused by the feedback mechanism. To offset the increased delay, simulated USB device 312 sends "fake" isochronous feedback to server side application 360 indicating that the first request has been completed by local device. In reference to the example in operation 502, server side application 360 may receive "fake" feedback that a previous segment of music had already been transmitted by the local device. Server side application 360 will, then, consider it timely to send a request for a next segment of music. Flow then proceeds to operation 508.

At operation 508 a second request for a next segment of music is sent from server side application 360 to simulated USB device 312. Like the first request, the second request includes an indication of a second processing time. As discussed above, simulated USB device acts as the actual device and processes the received request. Simulated USB device 312 compresses the I/O request and adds information necessary for USB device driver 314 to understand the request. Flow then proceeds to operation 510.

At operation 510, the first request and second requests are received at client side application from simulated USB device 312. In one embodiment, client side application decompresses the requests and adds information necessary for local device 208 to understand the request. As will be appreciated, the first and second requests may not be received by client side application at the same time. For simplicity purposes, the first and second requests will be discussed in operation 510 as being processed simultaneously. Flow then proceeds to operation 512.

At operation 512, the first request and second are sent to generic USB driver to be forwarded to local device. If client side application has decompressed and added necessary information to the first and second requests, the requests are processed as is by generic device driver for forwarding to local device. Processing comprises the generic device driver determining what application is requesting of local device and creating a local device 208 understandable requests. If client side application did not decompress or add information to the first and second requests, the generic device driver decompresses and adds information to the requests before processing the requests for forwarding to local device. Flow then proceeds to operation 514.

At operation 514, the first request is transmitted to local device at the first processing time. As discussed above, the first processing time is included in the request and indicates a time at which the request should be processed. Once the first request is processed, flow proceeds to operation 516.

At operation 516, the second request is transmitted to local device at the second processing time. As discussed above, the second processing time is included in the request and indicates a time at which the request should be processed. The second request is then processed. Flow then terminates.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternative embodiments having fewer than or more than all of the features herein described are possible.

While various embodiments have been described for purposes of this disclosure, various changes and modifications may be made which are well within the scope of the present disclosure. Numerous other changes may be made which will readily suggest themselves to those skilled in the art and which are encompassed in the spirit of the disclosure and as defined in the appended claims.

What is claimed is:

1. A computer implemented method for redirecting control of a device connected to a first data processing system to a second data processing system that is in communication with the first data processing system, the method comprising:
   discovering that the device is connected to the first data processing system;
   determining that control of the device should be redirected to the second data processing system assigning a globally unique identifier to the device;
   subsequent to determining that the device is identified by the globally unique identifier, installing a device driver at the first data processing system instead of installing an actual device driver for the device at the first data processing system;
   creating an instance of the device at the first data processing system;
   conveying a device parameter For configuring a simulated device from the device driver to the second data processing system, wherein the simulated device is identical to the instance of the device at the first data processing system and is configured to trigger the second data processing system to install an actual device driver at the second data processing system;
   receiving a first request and a second request at the device driver from the second data processing system, wherein the first request and the second request each comprise instructions for the device and the first request is associated with a first processing time and the second request is associated with a second processing time and the first processing time is earlier than the second processing time;
   sending the first request to the device at the first processing time; and
   sending the second request to the device at the second processing time.

2. The computer implemented method of claim 1, wherein the method further comprises:
   subsequent to discovering the device, determining whether the device could be redirected;
   subsequent to determining that the device could be redirected, providing the device to a user for selection in a device selection window.

3. The computer implemented method of claim 1, wherein the globally unique identifier is GUID common to an interface.

4. The computer implemented method of claim 1, wherein the globally unique identifier is assigned at a filter driver outside of a hub driver.

5. The computer implemented method of claim 1, further comprising:
   subsequent to creating the instance of the device, creating a generic device driver.

6. The computer implemented method of claim 1, further comprising:

compressing the device parameter using a remote desktop protocol.

7. The computer implemented method of claim 1, wherein conveying the device parameter comprises sending the device parameter to an application that communicatively connects the second data processing system and the first data processing system.

8. The computer implemented method of claim 7, wherein communicative connectivity is established by creating a virtual channel.

9. The computer implemented method of claim 1, further comprising: subsequent to receiving the first request, determining, by the device driver, if additional information needs to be incorporated into the first request for the device to understand the first request.

10. The computer implemented method of claim 1, further comprising: subsequent to receiving the second request at the device driver, determining, by the generic device driver, if additional information needs to be incorporated into the second request for the device to understand the second request.

11. The computer implemented method of claim 1 wherein the device is a USB device.

12. The computer implemented method of claim 1 wherein the device is a firewire device.

13. The computer implemented method of claim 1 wherein the first data processing system is a client computer.

14. The computer implemented method of claim 1 wherein the second data processing system is a server computer.

15. The computer implemented method of claim 1 wherein the device driver at the first data processing system is a generic device driver.

16. The computer implemented method of claim 1 further comprising simultaneously receiving the first request and the second request at the first data processing system.

17. The computer implemented method of claim 1 further comprising transforming an identifier associated with the device to the globally unique identifier for the device.

18. The computer implemented method of claim 17, further comprising formatting the first request and the second request as USB requests.

19. A computer implemented method of controlling a device connected to a first computer by a second computer, the method comprising:
identifying that the device has been selected for redirection;
receiving one or more device parameters from a generic device driver on the first computer, wherein the generic device driver is based on a globally unique identifier for the device;
using, wherein the device parameters are used to create a simulated device on the second computer;
installing a device-specific driver for the device at the second computer based on the simulated device;
sending a first request and second request for the device to the generic device driver on the first computer, wherein the first request and the second request comprise instructions for the device and each of the first request and second request is associated with a processing time and the processing time for the first request is earlier than the processing time of the second request;
in response to sending the second request, receiving faked feedback for allowing a third request to be sent to the generic device driver on the first computer before the second request is received by the first computer.

20. The computer implemented method of claim 19, further comprising compressing the first request received using a remote desktop protocol.

21. The computer implemented method of claim 19 wherein the driver is a USB driver.

22. The computer implemented method of claim 19 wherein the first computer is a client.

23. The computer implemented method of claim 19 wherein the second computer is a server.

24. A remote system comprising:
a first data processing system;
a second data processing system in communication with the first data processing system;
a device connected to the first data processing system, wherein the device is associated with an identifier, and wherein the identifier of the device is transformed into a globally unique identifier when the device is selected for redirection;
an instance of the device at the first data processing system, wherein the instance of the device is not treated as an actual device;
a generic driver at the first data processing system, wherein the generic driver is configured to communicate with the instance of the device and a first application at the first data processing system;
a simulated device at the second data processing system, wherein the simulated device is identical to the instance of the of the device and is treated as the actual device, and wherein the simulated device is configured to use one or more parameters specific to the device received from the generic driver and to send a first request to the instance of the device;
a real driver at the second data processing system communicatively coupled to the simulated device; and
a second application at the second data processing system communicatively coupled to the simulated device and the first application, wherein the second application is configured to receive feedback from the simulated device that the first request was processed by the device, wherein the feedback is sent from the simulated device before the first request is actually processed by the device.

25. The remote system of claim 24, the system further comprising:
a hub driver at the first data processing system, the hub driver configured to transform a specific identifier of the device into a globally unique identifier.

26. The remote system of claim 24, the system further comprising:
a filter driver at the first data processing system, the filter driver configured to transform a specific identifier of the device into a globally unique identifier.

27. The remote system of claim 24, wherein the first data processing system communicates with the second data processing system using a remote desktop protocol.

28. The remote system of claim 24, wherein device is a USB device.

29. The remote system of claim 24, wherein first data processing system is a client system.

30. The remote system of claim 24, wherein second data processing system is a server system.

* * * * *

UNITED STATES PATENT AND TRADEMARK OFFICE
CERTIFICATE OF CORRECTION

PATENT NO.         : 9,858,126 B2
APPLICATION NO.    : 12/970660
DATED              : January 2, 2018
INVENTOR(S)        : Chung Lang Dai et al.

Page 1 of 1

It is certified that error appears in the above-identified patent and that said Letters Patent is hereby corrected as shown below:

On the Title Page

Item (54) and in the Specification Column 1, Line 1:
DEVICE REDIRECTION FOR REMOTE SYSTEMS
Should read:
USB DEVICE REDIRECTION FOR REMOTE SYSTEMS Signed and Sealed this
Second Day of April, 2019

Andrei Iancu
*Director of the United States Patent and Trademark Office*